United States Patent Office 3,746,729
Patented July 17, 1973

3,746,729
NITROKETONIZED AMIDES AND THEIR
METHOD OF PREPARATION
Donald R. Lachowicz, Fishkill, N.Y., assignor to
Texaco Inc., New York, N.Y.
No Drawing. Filed Dec. 24, 1970, Ser. No. 101,407
Int. Cl. C09f 7/00
U.S. Cl. 260—404.5                13 Claims

ABSTRACT OF THE DISCLOSURE

Nitroketonized amides are provided corresponding to the formula:

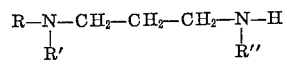

where R, R' or R" is a nitroketonized group and is prepared by contacting an amide represented by the formula:

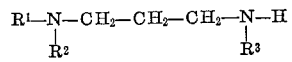

where at least one of the groups $R^1$, $R^2$ or $R^3$ is an alkenyl or alkenoyl, with a combination of oxygen and dinitrogen tetroxide such that unsaturated portions of the amide are converted to vicinal nitroketone groups. The novel compounds have utility as gasoline additives in that they provide motor fuel compositions with such properties as rust protection, carburetor de-icing and carburetor detergency.

BACKGROUND OF THE INVENTION

This invention relates to new compositions of matter and to a method for preparing the same. More particularly, this invention relates to nitroketonized amides particularly useful as multipurpose gasoline and hydrocarbon oil additives.

Broadly, this invention contemplates as a new composition a nitroketonized amide corresponding to the formula:

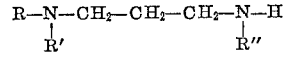

where R is an alkyl, alkenyl, nitroketonized alkyl or nitroketonized alkenyl group, where R' and R" alternately represent hydrogen and an alkanoyl, alkenoyl, nitroketonized alkanoyl or nitroketonized alkenoyl group, wherein at least one of said R, R' or R" is a nitroketonized group as heretofore defined. In particular, R when alkyl represents a group having from 1 to 40, preferably 8 to 22, carbon atoms and when alkenyl, nitroketonized alkyl or nitrokentonized alkenyl represents a group having from 4 to 40, preferably 8 to 22, carbon atoms. Further, R' or R" when alternately representing a group recited above, other than hydrogen, contains from 4 to 40, preferably 8 to 22, carbon atoms.

The nitroketonized amides of this invention are prepared by contacting the precursor, namely an acid amide, of the formula:

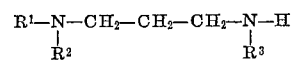

where $R^1$ is an alkyl group having from 1 to 40 carbon atoms or an alkenyl group having from 4 to 40 carbon atoms, where $R^2$ and $R^3$ alternately represent hydrogen and an alkanoyl group or an alkenoyl group having from 4 to 40 carbon atoms, wherein at least one of said $R^1$, $R^2$, or $R^3$ is an alkenyl or an alkenoyl group, with dinitrogen tetroxide and oxygen at a temperature of from about −35 to 45° C. in a mole ratio of said acid amide to dinitrogen tetroxide to oxygen of from 1:1:1 and 1:1.5:30. Preferably, the reaction is conducted at temperatures of from −10 to 30° C. and $R^1$, $R^2$ or $R^3$ represent groups having from 8 to 22 carbon atoms.

Nitroketonization of the aforementioned acid amide in accordance with this process is accomplished in a one-step reaction as contrasted to other known processes where olefins are initially converted to intermediate nitroperoxy conpounds and where the intermediate compound is subsequently contacted with denitrating agent to yield a nitroketone product. In the instant process, the introduction of a denitrating agent is not essential inasmuch as autogenous conversion at the point of unsaturation directly results in vicinal nitroketonization.

As can be seen, the acid amide containing at least one group identified as $R^1$, $R^2$, or $R^3$ possessing an unsaturated (—CH=CH—) group along a carbon chain is converted in the course of nitroketonization to a vicinal nitroketone function

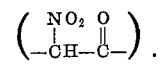

For example, unsaturation of the acid amide may be in $R^1$ as an alkenyl group such as 3-butenyl, 2-pentenyl, 10-undecenyl, 9-octadecenyl and 13-docosenyl. Alternatively $R^1$ may be an alkyl group such as methyl, ethyl, butyl, hexyl, dodecyl, hexadecyl and tetracosanyl. When $R^1$ is alkyl, unsaturation of the acid amide occurs at $R^2$ or $R^3$ as an alkenoyl group such as 2-methyl-3-butenoyl, 3-butenoyl, 10-undecenoyl, 8-hexadecenoyl, 9-octadecenoyl and 13-docosenoyl. Alternatively, when $R^2$ or $R^3$ is alkanoyl, such as isobutanoyl, heptanoyl, decanoyl, pentadecanoyl and tetracosanoyl, $R^1$ is an alkenyl group. Further, unsaturation may occur in a plurality of points along $R^1$, $R^2$ or $R^3$. Moreover, unsaturation at one or more points may occur simultaneously in $R^1$ and $R^2$ or $R^3$ as when $R^1$ is 9-octadecenyl and $R^2$ or $R^3$ is 10-undecenoyl. When unsaturation of $R^1$, $R^2$ or $R^3$ occurs internally, that is on other than a terminal carbon atom, the reaction yields a mixture of two isomeric vicinal nitroketonized amides, illustratively, N-(9-nitro-10-octadecanonyl) - N' - octadecanoyl-1,3-diaminopropane and N-(10 - nitro-9-octadecanonyl) - N' - octadecanoyl - 1,3 - diaminopropane. When unsaturation occurs between the terminal and adjacent carbon atom, nitration occurs on the terminal carbon and ketonization on the carbon vicinal thereto as for example N-decyl-N-(4-nitro-3-butanonoyl)-1,3-diaminopropane.

The unsaturated acid amide contemplated as a starting reactant is prepared from readily available materials. Essentially, such an acid amide is provided by reacting a primary amine with acrylonitrile to yield the corresponding N-(2-cyanoethyl)-N-alkylamine and subsequently selectively hydrogenating the cyano group to the N-hydrocarbyl-1,3-diaminopropane (a diamine) where the hydrocarbyl radical is alkyl or alkenyl. Subsequently, the N-hydrocarbyl-1,3-diaminopropane is reacted with a $C_4$ to $C_{40}$ alkanoic or alkenoic acid to form an ammonium salt of the acid which upon heating in the absence of added water is converted to the acid amide. With regard to the alkenyl or alkenoyl group, each may have one or more points of unsaturation, one of which subsequently undergoes nitroketonization according to the process herein described. For example polyunsaturated acids as those occurring in whale oil, fish oil, corn oil, linseed oil and other oils can be employed including 9,12-octadecadienoic acid and 9,12,15-octadecatrienoic acid.

In the course of nitroketonization of the acid amide, air can be employed as the source of oxygen or oxygen can be provided in admixture with inert gases such as nitrogen or argon. Under preferred conditions, oxygen and dinitrogen tetroxide are respectively introduced into the reaction zone containing the amide at the rate of bebetween 1 and 16 milliliters per minute of oxygen per gram of amide and between about 0.005 and 0.05 gram of dinitrogen tetroxide per minute per gram of amide.

Atmospheric and higher pressures may be employed and the reaction is conveniently conducted in the presence of inert organic solvents having from 4 to 22 carbon atoms exemplified by hydrocarbons including paraffins such as pentane, hexane, octane, decane, dodecane, octadecane; cycloparaffins such as cyclopentane and cyclohexane; and aromatic hydrocarbons such as benzene and toluene. In general, reaction times of about one-half to ten hours are employed, the time related to the rate of addition of the dinitrogen tetroxide.

It is to be noted that the dinitrogen tetroxide employed is actually an equilibrium mixture of dinitrogen tetroxide and nitrogen dioxide with the equilibrium being driven to essentially 100 percent dinitrogen tetroxide at 0° C. and essentially 100 percent nitrogen dioxide at 140° C. at 1 atmosphere pressure.

Nitroketonized amides provided according to this invention by way of illustration and not limitation include N-hexyl-N'-(9-nitro-10-octadecanonoyl)-1,3-diaminopropane,
N-hexyl-N'-(10-nitro-9-octadecanonoyl)-1,3-diaminopropane,
N-hexyl-N-(9-nitro-10-octadecanonoyl)-1,3-diaminopropane,
N-hexyl-N-(10-nitro-9-octadecanonoyl)-1,3-diaminopropane,
N-(9-nitro-10-octadecanonyl)-N'-heptanoyl-1,3-diaminopropane,
N-(10-nitro-9-octadecanonyl)-N'-heptanoyl-1,3-diaminopropane,
N-(13-nitro-14-docosanonyl)-N'-(8-hexadecenoyl)-1,3-diaminopropane,
N-(14-nitro-13-docosanonyl)-N'-(8-hexadecenoyl)-1,3-diaminopropane,
N-(13-docosenyl)-N'-(8-nitro-9-hexadecanonoyl)-1,3-diaminopropane and
N-(13-docosenyl)-N'-(9-nitro-8-hexadecanonoyl)-1,3-diaminopropane.

In general, effective detergent motor fuels are produced by adding from about 0.0001 to 0.1 weight percent of the nitroketonized acid amide to the gasoline. A preferred concentration of the nitroketonized acid amide is in the range of from about 0.001 to 0.02 weight percent which corresponds to about 3 to 60 ptb. (pounds of additive per 1000 barrels of fuel).

The carburetor detergency effect of the additive and motor fuels containing the same was determined in a specially developed engine test designated the Chevrolet V-8 Carburetor Detergency Test. This test was conducted using a Chevrolet V-8 engine equipped with a 4-barrel carburetor mounted on a test stand. The two secondary barrels of the carburetor were sealed and each of the primary barrels arranged so that an additive fuel could be run in one barrel and a base fuel run in the other. The primary carburetor barrels were modified to the extent that they had emovable aluminum inserts in the throttle plate area so that deposits formed in this area could be conveniently weighed.

In the test designed to determine the effectiveness of the detergent-containing fuel for preventing the lay-down of deposits, the engine is run for a period of 24 to 48 hours with the base fuel being fed to one barrel and the additive fuel to the other barrel while engine blow-by is circulated to the air inlet of the carburetor. After the run, the inserts are removed from the carburetor and weighed to detemine the difference between the performance of the additive and non-additive fuels. The aluminum inserts are then cleaned, replaced in the carburetor and the process repeated with the fuels reversed in the carburetor barrels to minimize differences in fuel distribution and barrel construction. The deposit weights in the two runs are averaged and the detergency effectiveness of the additive fuel expressed in percent.

The anti-icing properties of the additive-containing fuel was determined in a carburetor icing demonstrator apparatus consisting of a vacuum pump equipped so that cool moisture-saturated air from an ice tower is drawn through a sample glass tube gasoline carburetor. The gasoline sample is placed in a sample bottle and is drawn into the glass carburetor through a 20 gage hypodermic needle. Evaporation of the gasoline in the gas tube further cools the cold moist air with resulting ice formation on the throttle plate. The formation of ice on the throttle plate causes an engine to stall and it has been found that this condition is equivalent to a pressure drop across the throttle plate of about 0.5 inch and 0.9 inch of mercury and the time required to reach this pressure drop is noted. The vacuum pump is adjusted to give a vacuum of 1.8 inches of mercury and the test is run until either a pressure of 2.3 inches mercury has been reached or the run has continued for 300 seconds. Since, with most fuels, this pressure drop is reached in 1 to 4 minutes 300 seconds is the maximum time for a run. A fuel composition which provides a minimum of 200 seconds run in this test is an effective carburetor anti-icing fuel composition.

The anti-rusting properties of motor fuels was determined by inserting and thoroughly wetting a cold rolled steel strip into a tall form four ounce glass bottle containing 90 cc. of the fuel sample and adding 20 cc. of distilled water. The bottle was stoppered, agitated for fifteen seconds and stored at room temperature for 24 hours. The strip was thereafter visually respected and the percentage of rusted surface area estimated.

In order to more fully illustrate the nature of this invention and manner of practicing the same, the following examples are presented.

EXAMPLE I

To a solution of 14.7 grams (0.025 mole) of a mixture of N-(9 - octadecenyl)-N'-(9 - octadecenoyl) - 1,3 - diaminopropane and N - (9 - octadecenyl) - N - (9 - octadecenoyl)-1,3 diaminopropane in 200 ml. of n-hexane as inert solvent, there was added simultaneously oxygen at a rate of 60.8 milliliters per minute and dinitrogen tetroxide at the rate of 0.0081 mole per hour for 3.1 hours at 0° C. After 3.1 hours, 1.5 milliliters of liquid dinitrogen tetroxide (0.025 mole) had been transferred to the reaction flask and the solution was purged with oxygen for about 1 hour. The reaction mixture was washed with 150 ml. of 3.3% aqueous sodium bicarbonate and twice with 100 milliliters of water and dried over sodium sulfate. Sodium sulfate was subsequently removed by filtration and the n-hexane was stripped by rotary evaporation leaving a product residue of 10.8 grams. Infrared spectroscopic analysis of the product obtained after nitrooxidation showed the presence of a carbonyl function and absence of a peroxynitrate function and the product was identified as a mixture of nitroketonized amides including N-(10-nitro-9-octadecanonyl)-N'-(9-octadecenoyl)-1,3-diaminopropane,
N-(10-nitro-9-octadecanonyl)-N-(9-octadecenoyl)-1,3-diaminopropane,
N-(9-nitro-10-octadecanonyl)-N'-(9-octadecenoyl)-1,3-diaminopropane,
N-(9-nitro-10-octadecanonyl)-N-(9-octadecenoyl)-1,3-diaminopropane,
N-(9-octadecenyl)-N'-(10-nitro-9-octadecanonoyl)-1,3-diaminopropane,
N-(9-octadecenyl)-N-(10-nitro-9-octadecanonoyl)-1,3-diaminopropane,
N-(9-octadecenyl)-N'-(9-nitro-10-octadecanonoyl)-1,3-diaminopropane and
N-(9-octadecenyl)-N-(9-nitro-10-octadecanonoyl)-1,3-diaminopropane.

EXAMPLE II

Example I was repeated employing 14.7 grams (0.025 mole) of the mixed acid amide with 200 ml. of toluene as the inert solvent and simultaneously contacting the solution with oxygen introduced at the rate of 60.8 milliliters per minute and dinitrogen tetroxide at the rate of 0.0086 mole per minute for 2.9 hours. A product yield of 12.0 grams was obtained and identified as a mixture of nitroketonized amides as in Example I.

EXAMPLE III

To a solution of 25.5 grams (0.05 mole) of N-(9-octadecenyl)-N'-octanoyl-1,3-diaminopropane in 300 milliliters of n-pentane as inert solvent, there was added simultaneously oxygen at the rate of 60.8 milliliters per minute and dinitrogen tetroxide at the rate of 0.018 mole per hour for 2.75 hours at 0° C. After 2.75 hours 3.1 ml. of liquid dinitrogen tetroxide (0.05 mole) had been transferred to the reaction flask and the solution was purged with oxygen for about one hour. The solution was mixed with water forming an emulsion and pentane was stripped under vacuum and replaced with ether. The aqueous layer was separated and the organic layer was washed three times with 100 ml. portions of water. The organic layer was dried over anhydrous sodium sulfate, the latter removed by filtration and the solvent stripped from the product under vacuum. A yield of 12.9 grams of a product identified as a mixture of N-(10-nitro-9-octadecanonyl)-N'-octanoyl-1,3-diaminopropane and N-(9-nitro-10-octadecanonyl)-N'-octanoyl-1,3 - diaminopropane was recovered.

EXAMPLE IV

To a solution of 28.3 grams (0.05 mole) of N-($C_{8-18}$) alkyl-N'-(9 - octadecenoyl)-1,3-diaminopropane in 300 milliliters of carbon tetrachloride as inert solvent, there was added simultaneously oxygen at the rate of 60.8 ml. per minute and dinitrogen tetroxide at the rate of 0.015 moles per hour for 3.2 hours at 0° C. After 3.2 hours 3.1 ml. of liquid dinitrogen tetroxide (0.05 mole) had been transferred to the reaction flask and the solution was purged with oxygen for about one hour. The reaction mixture was washed three times with 100 ml. portions of water. The organic layer was dried over anhydrous sodium sulfate and the solvent was stripped from the product under vacuum. A yield of 18.8 grams of a product identified as a mixture of N-($C_{8-18}$) alkyl-N'-(10-nitro-9-octadecanonoyl)-1,3-diaminopropane and N-($C_{8-18}$) alkyl-N'-(9 - nitro - 10 - octadecanonoyl)-1,3-diaminopropane was recovered.

EXAMPLE V

The base fuel employed in the following examples was a premium grade gasoline having a research octane number of about 101.5 containing 3.0 cc. of tetraethyllead per gallon. This gasoline consisted of about 25 percent aromatic hydrocarbons, 14.5 percent olefin hydrocarbons, 60.5 percent paraffinic hydrocarbons and boiled in the range of about 95° F. to 380° F.

A gasoline blend was prepared consisting of the above base fuel containing 5 ptb. (pound per 1000 barrels of gasoline) of an acid amide mixture of N-(9 - octadecenyl)-N' - (9-octadecenoyl)-1,3-diaminopropane and N-(9-octadecenyl)-N-(9-octadecenoyl) - 1,3 - diaminopropane. Another gasoline blend was prepared consisting of the above base fuel containing 5 pptb. of the nitroketonized acid amide reaction product of Example I. The base fuel and each of the additive-containing gasoline blends were tested and compared for their carburetor detergency properties in the above described Chevrolet V–8 Carburetor Detergency Test. From the test, it was determined that the gasoline blend containing the acid amide additive mixture was 39 percent more effective than the base gasoline in preventing the build-up of deposits in the carburetor. The gasoline blend containing the nitroketonized acid amide additive was 63 percent more effective than the base gasoline in preventing the build-up of deposits in the carburetor.

EXAMPLE VI

The base fuel employed in this example was a premium grade gasoline having a research octane number of about 102.0 containing 2.86 cc. of tetraethyllead per gallon. This gasoline consisted of about 34 percent aromatic hydrocarbons, 9 percent olefinic hydrocarbons, 57 percent paraffinic hydrocarbons and boiled in the range of about 90° F. to 380° F. A gasoline blend was prepared consisting of the base fuel containing 32 ptb. of nitroketonized reaction product recited in Example II. The base fuel and gasoline blend above were tested for the carburetor anti-icing properties. The stalling time of base fuel at 0.5 inch of mercury was 47 seconds and at 0.9 inch of mercury was 54 seconds. The gasoline blend containing 32 pounds per thousand barrels of the nitroketonized reaction product at 0.5 inch of mercury was 231 seconds and at 0.9 inch of mercury was 264 seconds.

The anti-rusting properties of the base fuel alone and the base fuel containing 32 pounds per thousand barrels of the nitroketonized reaction product of Example II were determined employing the test procedure heretofore described. An examination of the cold-rolled steel strip contracted with the fuel layer in the base fuel revealed that about 95 percent of the surface area had rusted. In comparison, the base fuel containing the nitroketonized amide showed zero percent rusting of the surface area contacted with the fuel layer.

The nitroketonized product of Example I was evaluated to determine its affect, if any, on a motor fuel's research octane at various concentrations with the results tabulated below.

| Additive in gasoline containing 3 cc. TEL/gallon | Research octane number |
| --- | --- |
| None (base gasoline) | 101.5 |
| Nitroketonized amide 64 ptb. | 101.6 |
| Nitroketonized amide 128 ptb. | 101.6 |
| Nitroketonized amide 256 ptb. | 101.5 |

From the tabulation it will be seen that even at high concentrations the additive caused no significant change in octane number.

I claim:

1. A nitroketonized amide corresponding to the formula:

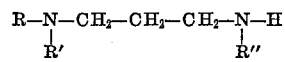

where R is an alkyl group having from 1 to 40 carbon atoms or an alkenyl, nitroketonized alkyl or nitroketonized alkenyl group having from 4 to 40 carbon atoms, where R' and R" alternately represent hydrogen and an alkanoyl, alkenoyl, nitroketonized alkanoyl or nitroketonized alkenoyl group having from 4 to 40 carbon atoms, wherein at least one of said R, R' or R" is a nitroketonized alkanoyl or alkenoyl group having from 8 to 22 carbon atoms.

2. A nitroketonized amide according to claim 1 where R has from 8 to 22 carbon atoms.

3. A nitroketonized amide according to claim 1 where R' or R" has from 8 to 22 carbon atoms.

4. N-(10 - nitro-9-octadecanonyl)-N'-(9-octadecenoyl)-1,3-diaminopropane.

5. N-(9 - octadecenyl)-N-(10-nitro-9-octadecanonoyl)-1,3-diaminopropane.

6. N-(10 - nitro - 9-octadecanonyl)-N'-octanoyl-1,3-diaminopropane.

7. N-(9 - nitro - 10-octadecanonyl)-N'-octanoyl-1,3-diaminopropane.

8. N-($C_{8-18}$) alkyl-N'-(10-nitro-9-octadecanonoyl)-1,3-diaminopropane.

9. A method of preparing a nitroketonized amide which comprises contacting an acid amide of the formula:

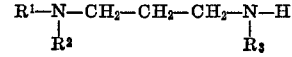

where $R^1$ is an alkyl group having from 1 to 40 carbon atoms or an alkenyl group having from 4 to 40 carbon atoms, where $R^2$ and $R^3$ alternately represent hydrogen and an alkanoyl group or an alkenoyl group having from 4 to 40 carbon atoms, where at least one of said $R^1$, $R^2$ or $R^3$ is an alkenoyl group having from 8 to 22 carbon atoms, with dinitrogen tetroxide and oxygen at a temperature of from about −35 to 45° C., wherein the mole ratio of said acid amide to dinitrogen tetroxide to oxygen is from 1:1:1 to 1:1.5:30.

10. A method according to claim 9 wherein said contacting is conducted at a temperature of from −10 to 30° C.

11. A method according to claim 9 wherein said acid amide comprises a mixture of N-(9-octadecenyl)-N'-(9-octadecenoyl) - 1,3-diaminopropane and N-(9-octadecenyl)-N-(9-octadecenoyl)-1,3-diaminopropane.

12. A method according to claim 9 wherein said acid amide is N-(9-octadecenyl)-N'-octanoyl-1,3-diaminopropane.

13. A method according to claim 9 wherein said acid amide is N-($C_{8-18}$) alkyl-N'-(9 - octadecenoyl)-1,3-diaminopropane.

References Cited
UNITED STATES PATENTS

| | | | |
|---|---|---|---|
| 2,805,135 | 9/1957 | Bell et al. | 44—71 |
| 2,982,632 | 5/1961 | Andress, Jr. | 44—71 |
| 3,458,582 | 7/1969 | Lachowicz et al. | 260—404.5 |
| 3,632,511 | 1/1972 | Liao | 44—71 |

LEWIS GOTTS, Primary Examiner

G. HOLLRAH, Assistant Examiner

U.S. Cl. X.R.

260—561 K, 561 N, 561 R, 584 A; 44—71